(12) United States Patent
Gosch et al.

(10) Patent No.: US 10,885,214 B2
(45) Date of Patent: Jan. 5, 2021

(54) ADDITIVE MANUFACTURING SYSTEM AND METHOD FOR VALIDATING ADDITIVELY MANUFACTURED COMPONENTS

(71) Applicant: Airbus Operations GmbH, Hamburg (DE)

(72) Inventors: Claus Gosch, Hamburg (DE); Peter Linde, Hamburg (DE); Matthias Hegenbart, Hamburg (DE)

(73) Assignee: Airbus Operations GmbH

( * ) Notice: Subject to any disclaimer, the term of this patent is extended or adjusted under 35 U.S.C. 154(b) by 466 days.

(21) Appl. No.: 15/840,031

(22) Filed: Dec. 13, 2017

(65) Prior Publication Data

US 2018/0178451 A1 Jun. 28, 2018

(30) Foreign Application Priority Data

Dec. 23, 2016 (DE) .......................... 10 2016 226 159

(51) Int. Cl.
*G06F 21/60* (2013.01)
*B33Y 10/00* (2015.01)
(Continued)

(52) U.S. Cl.
CPC .......... *G06F 21/608* (2013.01); *B22F 3/1055* (2013.01); *B29C 64/135* (2017.08);
(Continued)

(58) Field of Classification Search
CPC .... G06F 21/608; H03M 13/09; B22F 3/1055; B22F 2003/1057; B29C 64/135;
(Continued)

(56) References Cited

U.S. PATENT DOCUMENTS 10,538,034 B2 * 1/2020 Walker ................. B29C 64/386
2008/0191030 A1 8/2008 Ma et al.
(Continued)

FOREIGN PATENT DOCUMENTS

DE  10 2007 045 692 A1  4/2009
DE  10 2011 078 757 A1  1/2013
EP        2 757 736 A1  7/2014

OTHER PUBLICATIONS 3D opportunity for blockchain Additive manufacturing links the digital thread Deloitte University Press Nov. 17, 2016 (Year: 2016).*

(Continued)

*Primary Examiner* — Kambiz Zand
*Assistant Examiner* — Benjamin A Kaplan
(74) *Attorney, Agent, or Firm* — Lerner, David, Littenberg, Krumholz & Mentlik, LLP

(57) ABSTRACT

Validating additively manufactured components is carried out by transmitting to a distributed validation network printing specification data for a component that is to be additively manufactured, validating the printing specification data, and adding the printing specification data, together with a cryptographically encoded checksum, to a print history log, transmitting the printing specification to a 3D printing device, and implementing a generative manufacturing process for the component that is to be additively manufactured in accordance with the transmitted printing specification data. While the generative manufacturing process is being carried out, in each case following specified manufacturing stages, a plurality of manufacturing parameters prevailing in the preceding manufacturing stage are transmitted to the distributed validation network. Subsequent manufacturing stages are released in order to be implemented in the 3D printing device only if the transmit- (Continued)

ted manufacturing parameters have been successfully matched to the printing specification data stored in the print history log.

18 Claims, 1 Drawing Sheet

(51) Int. Cl.
| | |
|---|---|
| *B33Y 30/00* | (2015.01) |
| *B33Y 50/00* | (2015.01) |
| *B29C 64/386* | (2017.01) |
| *B29C 64/135* | (2017.01) |
| *B22F 3/105* | (2006.01) |
| *H03M 13/09* | (2006.01) |

(52) U.S. Cl.
CPC ............ *B29C 64/386* (2017.08); *B33Y 10/00* (2014.12); *B33Y 30/00* (2014.12); *B33Y 50/00* (2014.12); *H03M 13/09* (2013.01); *B22F 2003/1057* (2013.01)

(58) Field of Classification Search
CPC ....... B29C 64/386; B33Y 10/00; B33Y 30/00; B33Y 50/00
USPC ............................................................ 726/2
See application file for complete search history.

(56) References Cited

U.S. PATENT DOCUMENTS

| | | |
|---|---|---|
| 2009/0165126 A1 | 6/2009 | Jung et al. |
| 2015/0112472 A1 | 4/2015 | Chen et al. |
| 2015/0224715 A1 | 8/2015 | Badhani et al. |
| 2015/0350278 A1 | 12/2015 | Isbjomssund et al. |
| 2015/0352885 A1 | 12/2015 | Wee et al. |
| 2016/0098730 A1 | 4/2016 | Feeney |
| 2016/0098825 A1* | 4/2016 | Dave .................. G06K 9/52 419/53 |

OTHER PUBLICATIONS

Press Release "Cubichain Technologies Brings Blockchain Cyber-Security to the 3D Printing Industry" (Nov. 15, 2016) http://www.cubichain.com/resources/Cubichain.Press.Release.II.15.16.pdf.

Zeltmann, S.E., Gupta, N., Tsoutsos, N.G., Maniatakos, M., Rajendran, j., Kam, R.: "Manufacturing and Security Challenges in 3D Printing", JOM (2016) 68: 1872. https://doi.org/10.1007/s11837-016-1937-7.

Carmela Demaria: "Softwares for 3D printing", Nov. 26, 2013 (Nov. 26, 2013), XP055473202, Retrieved from the Internet: URL:http://www.centropiaggio.unipi.it/sites/default/files/course/material/2013-11-26%20Software%20per%203D%20printing.pdf [retrieved on May 7, 2018].

Muller Jens: "Exploiting Network Printers a survey of security flaws in Laser Printers and Multi-function devices", Research-Technology Management, Sep. 30, 2016 (Sep. 30, 2016), XP055473224, Retrieved from the Internet: URL:https://www.nds.rub.de/media/ei/arbeiten/2017/01/30/exploiting-printers.pdf [retrieved on May 7, 2018].

Nov. 2016: "3D Printing and the Future of Supply Chains a DHL perspective on the state of 3D printing and implications for logistics", Nov. 30, 2016 (Nov. 30, 2016), XP055473197, Retrieved from the Internet: URL:http://www.dhl.com/content/dam/downloads/g0/about_us/logistics_insights/dhl_trendreport_3dprinting.pdf [retrieved on May 7, 2018].

* cited by examiner

ADDITIVE MANUFACTURING SYSTEM AND METHOD FOR VALIDATING ADDITIVELY MANUFACTURED COMPONENTS

FIELD OF THE INVENTION

The invention relates to a method for validating additively manufactured components, and to a distributed validation and certification system for validating and certifying additively manufactured components during manufacturing, in particular for use during the production of quality-assured components in the aerospace industry.

BACKGROUND OF THE INVENTION

Stereolithography (SLA), selective laser sintering (SLS) and selective laser melting (SLM) belong to the group of generative manufacturing methods and are also commonly referred to as "3D printing methods". In this case, data sets are generated on the basis of geometric models, which data sets are used in a special generative manufacturing system for producing objects having a predefined shape from amorphous materials such as liquids and powders, neutrally shaped semi-finished products such as band-shaped, wire-shaped or strip-shaped material, by means of chemical and/or physical processes. 3D printing methods use additive processes in which the starting material is built up sequentially in layers to form predetermined shapes.

3D printing methods are currently widely used in the production of prototypes or in rapid product development (RPD), in which a resource-efficient process chain is used for small-scale and large-scale series production, as required, of individualised components. 3D printing methods have various uses in civil engineering, in architecture, in dental technology, in toolmaking, in implantology, in industrial design, in the automotive industry and in the aerospace industry.

3D printers, and in particular laser sintering devices, use both a computer-aided construction system (computer-aided design, CAD) and a beam system which carries out the generative layer construction of the object to be printed on the basis of the digital manufacturing model provided by the CAD system. A three-dimensional CAD model of the object to be printed undergoes a preparation procedure here which is carried out in order to generate the control data required for the beam system and is known as "slicing". In this process, the CAD model is digitally broken down into layers of a predetermined uniform thickness having layer normal in the construction direction of the beam system, which layers then form the basis for controlling the beam of energy on the starting material surface in the beam system. A conventional layer breakdown algorithm constructs the CAD model on an inlaid surface model in this case, which results in a number of closed curves or surface polygons which define the "slices" between two model sections which are in succession in a manner perpendicular through the construction direction of the beam system.

Surface models of this kind can be stored for example in STL format, which is conventional for stereolithography and which describes the surface geometry of the three-dimensional object to be printed in the form of raw data having unstructured triangle textures. The beam system reads the surface model data and converts said data into a corresponding control pattern for the laser beam in an SLA, SLS or SLM manufacturing method.

Since the additive manufacturing occurs in a decentralised manner and merely on the basis of digital model data, the boundaries between original parts and parts from third-party suppliers are becoming increasingly blurred. As set out, for example, in Zeltmann, S. E., Gupta, N., Tsoutsos, N. G., Maniatakos, M., Rajendran, j., Kam, R.: "Manufacturing and Security Challenges in 3D Printing", JOM (2016) 68: 1872, it is expedient in principle to take measures to protect the quality of additively manufactured components produced decentrally. These measures are particularly important in particular at the level of digital data, since sufficient protection at the data transmission level may make it unnecessary to check the finished components.

Various approaches in the prior art relate to monitoring and tracking 3D printing processes: For example, the firm Cubichain Technologies offers blockchain-based certification processes for the additive manufacturing of components in the aircraft industry (http://www.cubichain.com/resources/Cubichain.Press.Release.ll.15.16.pdf). EP 2 757 736 A1 relates to secure transmission methods for control commands in digitally controlled manufacturing systems. US 2015/0112472 A1 discloses methods for controlling and monitoring 3D printing processes remotely. Finally, US 2016/0098730 A1 discloses a method for verifying the provenance and quality of goods on the basis of a distributed digital block-chain log.

BRIEF SUMMARY OF THE INVENTION

Therefore, it is an idea of the invention to find solutions for monitoring, validating and certifying properties of objects produced in generative manufacturing methods.

According to a first aspect of the invention, a method for validating additively manufactured components comprises the steps of transmitting, to a distributed validation network by means of a print job entity, printing specification data for a component that is to be additively manufactured, validating the printing specification data by means of the distributed validation network, and adding the printing specification data, together with a cryptographically encoded checksum, to a print history log managed by the distributed validation network, transmitting the printing specification data by means of the print job entity to a 3D printing device, and implementing a generative manufacturing process for the component that is to be additively manufactured, by means of the 3D printing device and in accordance with the transmitted printing specification data. While the generative manufacturing process is being carried out, following specified manufacturing stages in each case a plurality of manufacturing parameters prevailing in the preceding manufacturing stage are transmitted to the distributed validation network.

Subsequent manufacturing stages are released by the distributed validation network in order to be implemented in the 3D printing device only if the transmitted manufacturing parameters have been successfully matched to the printing specification data stored in the print history log.

According to a second aspect of the invention, a system for validating and certifying additively manufactured components during manufacturing comprises a print job entity that is configured to transmit, to a distributed validation network, printing specification data for a component that is to be additively manufactured. The distributed validation network is configured to validate the printing specification data and to add said data, together with a cryptographically encoded checksum, to a print history log managed by the distributed validation network. The system further comprises a 3D printing device that is configured to implement a generative manufacturing process for the component that is to be additively manufactured, in accordance with the printing specification data transmitted by the print job entity to the 3D printing device. In the system, the 3D printing device is configured to transmit to the distributed validation network, while the generative manufacturing process is being carried out and in each case following specified manufacturing stages, a plurality of manufacturing parameters that are prevailing in the preceding manufacturing stage, and to implement subsequent manufacturing stages only if the distributed validation network has successfully matched the transmitted manufacturing parameters to the printing specification data stored in the print history log.

According to a third aspect of the invention, computer-executable instructions are stored on a non-volatile computer-readable memory medium, which instructions, when executed by a data-processing system, cause the data-processing system to implement the steps of a validation method according to the first aspect of the present invention.

An essential concept of the invention is that of monitoring the manufacturing process, during the generative manufacturing of components, at the digital level by means of validation in an entity that is neutral, can be checked and is open at least for the involved parties. A block-chain protocol can be implemented for this purpose in a distributed information network, the entries of which protocol are concatenated and thus made accessible for checking by the entry-makers. Digitally linking 3D print jobs and 3D print job execution, and the associated possibility for monitoring adherence to print job specifications during execution of the print job make it possible to validate the entire generative manufacturing process and to certify said process, also for third parties, when validation is successful. In addition, the printing process itself can be continuously monitored in order to uncover discrepancies that occur inadvertently or are caused by contractors acting mala fide. For example, it is possible to effectively prevent acceptance of advantages when executing the print job by saving material or by using printing parameters that are cost-saving but that lead to qualitatively inferior end products.

3D printing processes are advantageous in particular for manufacturing components, since said processes make it possible to produce three-dimensional components in primary forming methods without the need for special manufacturing tools adapted to the outer shape of the components. This allows for highly efficient, material-saving and time-saving production processes for components. 3D printing methods of this kind are particularly advantageous for structural components in the aerospace field, since a large number of different components are used here which are adapted to specific uses and can be produced in 3D printing methods of this kind with low costs, low production lead times and little complexity in the manufacturing facilities required for production.

Validating components in the aerospace industry that are produced in 3D printing processes makes it possible not only to monitor manipulation in the material composition, deviations from specified or desired printing parameters, the number of replicates, the time of printing, and other parameters relating to an additive manufacturing process, but also to carry out verification regarding adherence to client specifications. The validation methods set out herein allow for automatable remote control of 3D printing processes, which allows individual quality control of each individual component produced. The documentation required therefor can be recorded in a validation protocol so as to be unmanipulable by any parties involved in the process, in accordance with known and specified logging standards. If required, certificates regarding the proven quality of the components can be issued on the basis of this validation protocol, the authenticity of which certificates can also be easily checked by third parties.

The complete digitisation of the validation and certification process reduces the logistical and administrative effort to a minimum. Furthermore, the paperless documentation chain allows all parties involved to save on costs. The distributed system makes archiving of the validation and certification history extremely efficient and secure from data loss.

Embodiments and developments can be found from the additional dependent claims and from the description with reference to the drawings.

According to some embodiments of the validation method according to the invention, the cryptographically encoded checksum can be formed by a hash function that comprises the transmitted printing specification data and the cryptographically encoded checksum of the last log entry of the print history log as the function argument.

According to some further embodiments of the validation method according to the invention, in addition to the geometrical information regarding the three-dimensional data model of the component that is to be additively manufactured, the printing specification data can contain information regarding the printing material to be used, the temperature to be used during the additive manufacturing, the ambient pressure to be applied during the additive manufacturing, the quantity of printing material to be used and/or the type of generative manufacturing process to be implemented.

According to some further embodiments of the validation method according to the invention, the 3D printing device and the print job entity can be spatially separated from one another. This is frequently the case in particular if the print job entity is an aircraft manufacturer, for example, that commissions subcontractors, operating the relevant 3D printing devices, with the repair, replacement or new manufacturing of components.

According to some further embodiments of the validation method according to the invention, the validation method can further comprise the step of creating, by means of a certification point, a certificate, regarding successful validation of the generative manufacturing method, for the additively manufactured component if each of the manufacturing stages of the generative manufacturing process has been released by the distributed validation network. In this case, in some embodiments, the created certificate can in addition be added, together with a cryptographically encoded checksum, to the print history log. This type of certification digitally couples the certificate to the print history and thus allows individualised and component-based certification that all third parties can trace but cannot manipulate.

According to some further embodiments of the validation method according to the invention, the 3D printing device can apply a check code, corresponding to the certificate, to the additively manufactured component using a generative manufacturing method. It is thus possible to also physically couple the individual component to the validation of the manufacturing process. In this case, the check code can function as proof of authenticity on the component itself.

According to some further embodiments of the validation method according to the invention, the manufacturing parameters transmitted following the manufacturing stages can be added, together with a cryptographically encoded checksum, to the print history log if the transmitted manufacturing parameters have been successfully matched to the printing specification data stored in the print history log.

According to some further embodiments of the validation method according to the invention, the manufacturing stages can each comprise a specified number of print layers of the generative manufacturing process.

According to some further embodiments of the validation method according to the invention, the generative manufacturing process can be carried out using a metal material for manufacturing the component.

According to some further embodiments of the validation method according to the invention, the generative manufacturing process can comprise stereolithography, selective laser sintering or selective laser melting.

According to some embodiments of the system according to the invention, the system can further comprise a certification point that is configured to create a certificate, relating to successful validation of the generative manufacturing process, for the additively manufactured component if each of the manufacturing stages of the generative manufacturing process has been released by the distributed validation network.

According to some further embodiments of the system according to the invention, a certificate created in such a manner can be added, together with a cryptographically encoded checksum, to the print history log.

According to some further embodiments of the system according to the invention, the 3D printing device can further be configured to apply a check code, corresponding to the certificate, to the additively manufactured component using a generative manufacturing method.

The above-mentioned embodiments and developments can be combined in any manner, if appropriate. Further possible embodiments, developments and implementations of the invention include combinations of features of the invention described previously or below with respect to the embodiments, even if not explicitly specified. In particular, a person skilled in the art will also add individual aspects as improvements or supplements to the particular basic form of the present invention.

BRIEF DESCRIPTION OF THE DRAWINGS

The present invention will be described in greater detail below with reference to the embodiments shown in the schematic drawings, in which.

Figure 1:
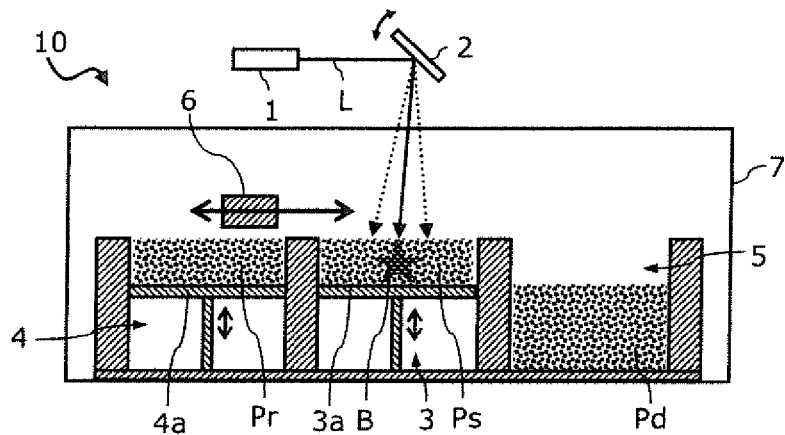
FIG. 1 is a view, by way of example, of a system for the generative manufacturing of components in accordance with an embodiment of the invention.

The accompanying drawings are intended to facilitate further understanding of the embodiments of the invention. Said drawings illustrate embodiments and, together with the description, serve to explain principles and concepts of the invention. Other embodiments and many of the advantages mentioned can be found with reference to the drawings. The elements of the drawings are not necessarily shown true to scale relative to one another. Terms specifying direction, such as "upper", "lower", "left", "right", "above", "below", "horizontal", "vertical", "front", "rear" and similar details are used merely for explanatory purposes and are not intended to restrict the generality to specific embodiments as shown in the drawings.

In the figures of the drawings, identical, functionally identical and identically operating elements, features and components are in each case provided with the same reference numerals, unless indicated otherwise.

DETAILED DESCRIPTION 3D printing methods within the context of the present application include all generative manufacturing methods in which objects having a predefined shape are produced, on the basis of geometric models, from amorphous materials such as liquids and powders, neutrally shaped semi-finished products such as band-shaped, wire-shaped or strip-shaped material, by means of chemical and/or physical processes in a special generative manufacturing system. In the context of the present application, 3D printing methods use additive processes in which the starting material is built up sequentially in layers to form predetermined shapes. In this case, 3D printing methods comprise in particular stereolithography (SLA), selective laser sintering (SLS) and selective laser melting (SLM). In the context of the present invention, 3D printing methods in particular include additive manufacturing methods in which metal starting materials such as liquefied metal or metal powder are used for the generative manufacturing of components.

FIG. 1 is a schematic view of a system 10 for the generative manufacturing of components, referred to in the following as a 3D printing device 10. The 3D printing device 10 can for example be a facility for selective laser sintering, a facility for selective laser melting or a stereolithography facility. In the following, the basic principles of the 3D printing device 10 are explained by way of example in connection with SLS, although printing devices for other 3D printing methods may have a different structure.

An energy source, for example a $CO_2$ laser 1, sends an energy beam, in a locationally selective manner, to a specific part of a powder surface of a powdered material Ps, which lies on a work platform 3a in a working chamber 3. For this purpose, an optical deflection device or a scanner module 2, such as a mobile or tilting mirror, can be provided which deflects the laser beam L onto a specific part of the powder surface of the powder Ps, depending on the tilt position of said mirror. The powdered material Ps may for example comprise a metal powder or a metal-alloy powder.

The powder Ps is heated at the point of impact of the laser beam L such that the powder particles are locally fused and form an agglomerate when cooled. The laser beam L scans the powder surface in accordance with a digital manufacturing model which is provided by a CAD system and is optionally processed. After the selective melting and local agglomeration of the powder particles in the surface layer of the powder Ps, excess powder Pd which is not agglomerated can be transferred to an excess container 5. The work platform 3a is subsequently lowered and new powder Pr is delivered from a powder reservoir 4 comprising a reservoir platform 4a into the working chamber 3, using a levelling roller 6 or another suitable doctor blade device or roller device. In order to accelerate the melting process, the powder Pr from the powder reservoir 4 can be preheated by infrared light to a working temperature which is just below the melting point of the powder.

In this way, a three-dimensional sintered or "printed" object B made of agglomerated powder is produced in an iterative generative construction process. In this case, the surrounding powder supports the part of the object B constructed so far, meaning that no external support structure is necessary. The continuous downward movement of the work platform 3a results in layered model generation of the object B. The object B can for example be a component B, for example a component B for use in the aerospace industry.

Figure 2:
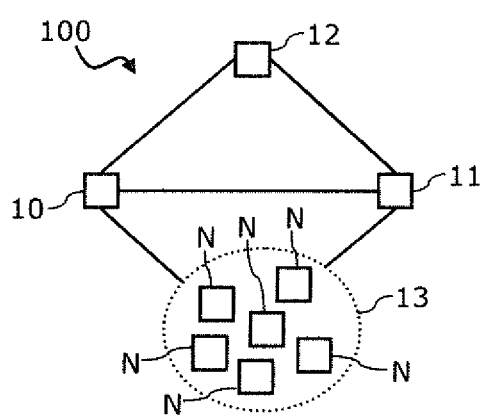
FIG. 2 is a schematic view of a system environment for validating and certifying additively manufactured components during manufacturing in accordance with a further embodiment of the invention.

FIG. 2 is a schematic view of a system environment for validating and certifying additively manufactured components during manufacturing. In this case, reference is made, by way of example and without restricting the generality, to a generative manufacturing process for components in the aerospace industry. A print job entity 11, such as an airline, an aircraft manufacturer or another organisation, creates, itself or upon request by a client, printing specification data for a component B that is to be additively manufactured. In addition to the geometrical information regarding the three-dimensional data model of the component B that is to be additively manufactured (such as an STL file), these printing specification data can for example contain information regarding the printing material to be used, the temperature to be used during the additive manufacturing, the ambient pressure to be applied during the additive manufacturing, the quantity of printing material to be used and/or the type of generative manufacturing process to be implemented.

The printing specification data are first transmitted from the print job entity 11 to a distributed validation network 13 where said data are validated, i.e. checked for consistency and for compatibility with previously defined boundary conditions. In particular, validating the printing specification data allows the printing contractor to trace the print job and the compatibility, in each case, with the contractual requirements aids in the collaboration with the print job client. The printing specification data are then added, together with a cryptographically encoded checksum, for example a hash function value, the hash function of which comprises the transmitted printing specification data and the cryptographically encoded checksum of the last log entry of the print history log as the function argument, to a print history log managed by the distributed validation network 13. This print history log is made accessible to all the nodes N of the validation network 13 by means of a regular flooding process. Only the most current print history log that has correct entries is used for further processing and for adding further entries. In this case, the cryptographic checksums are used to check the correctness of the entries.

A 3D printing device 10 receives the validated printing specification data from the print job entity 11 or fetches said data itself from the validated print history log, and starts the generative manufacturing process for the component B that is to be additively manufactured, in accordance with the corresponding printing specification data. In this case, the 3D printing device 10 can be spatially separated from the print job entity 11. Moreover, the print job entity 11 does not necessarily require the printing process to be actively monitored during the printing process in the 3D printing device 10, since validation of the entire printing process in the 3D printing device 10 is ensured, throughout the runtime, by the unmanipulable print history log.

For this purpose, while the generative manufacturing process is being carried out, a tracking step is provided in each case following specified manufacturing stages, in which tracking step the 3D printing device 10 is to transmit to the distributed validation network 13 a plurality of manufacturing parameters that are prevailing in the preceding manufacturing stage. The manufacturing stages can, for example, each comprise a specified number of print layers of the generative manufacturing process. In particular, it may be possible to match the manufacturing parameters to the printing specification data according to the print history log after every individual printed material layer. The manufacturing parameters transmitted by the 3D printing device 10 following the manufacturing stages can be added, together with a cryptographically encoded checksum, to the print history log in order to improve the traceability of the manufacturing process and for documentation purposes. Of course, this addition occurs only if the transmitted manufacturing parameters have been successfully matched to the printing specification data stored in the print history log, i.e. if a majority decision can be made in the distributed validation network 13 regarding the consistency of the printing parameters prevailing in the manufacturing stage with the printing parameters required in the printing specification data.

Only in this case are subsequent manufacturing stages released for the 3D printing device 10, i.e. the 3D printing device 10 can only validly continue the 3D printing process if the distributed validation network 13 has successfully matched the transmitted manufacturing parameters to the printing specification data stored in the print history log.

A certification point 12 can further be created in the system 100, which certification point can create a certificate, for the additively manufactured component B, regarding successful validation of the generative manufacturing process. Certificates of this kind are issued only if each of the manufacturing stages of the generative manufacturing process has been released by the distributed validation network 13. In this case, the certificate can be added, together with a cryptographically encoded checksum, to the print history log, for example again using a hash protocol. Moreover, following successful certification, the 3D printing device 10 can apply a check code, corresponding to the certificate, to the additively manufactured component using a generative manufacturing method. The check code can, for example, be an alphanumeric string that corresponds to the last valid hash value of the certificate.

Figure 3:
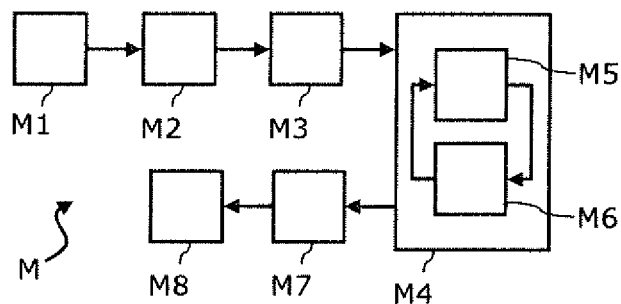
FIG. 3 is a block diagram of a method for validating additively manufactured components according to a further embodiment of the invention.

FIG. 3 is a block diagram of a schematic sequence of a validation method M for additively manufactured components, for example components B of the type that can be produced in a 3D printing device such as the 3D printing device 10 shown in FIG. 1. Here, the validation method M can use the infrastructure of the system, as has been explained in conjunction with FIG. 2.

In a first step M1, printing specification data for a component B that is to be additively manufactured are transmitted to a distributed validation network 13 by means of a print job entity 11. In addition to the geometrical information regarding the three-dimensional data model of the component B that is to be additively manufactured (such as STL files), the printing specification data can for example contain information regarding the printing material to be used, the temperature to be used during the additive manufacturing, the ambient pressure to be applied during the additive manufacturing, the quantity of printing material to be used and/or the type of generative manufacturing process to be implemented.

In a second step M2, the distributed validation network 13 validates the printing specification data and adds said data, together with a cryptographically encoded checksum, to a print history log managed by the distributed validation network 13. This cryptographically encoded checksum can for example be formed by a hash function that comprises the transmitted printing specification data and the cryptographically encoded checksum of the last log entry of the print history log as the function argument. Subsequently, in a step M3, the printing specification data are transmitted by the print job entity 11 to a 3D printing device 10 that can also be spatially separated from the print job entity 11.

The actual generative manufacturing process for the component B that is to be additively manufactured is carried out in step M4 by means of the 3D printing device 10 and in accordance with the transmitted printing specification data. While the generative manufacturing process is being carried out, following specified manufacturing stages in each case, in a step M5, a plurality of manufacturing parameters prevailing in the preceding manufacturing stage are iteratively transmitted to the distributed validation network 13. This is followed by a step M6 of matching the transmitted manufacturing parameters to the printing specification data stored in the print history log. As feedback, when matching is successful, the distributed validation network 13 releases the subsequent manufacturing step to be implemented in the 3D printing device 10. Steps M5 and M6 are repeated until, in the case of incorrect printing, the generative manufacturing process has to be terminated as not validatable, or until the last of the preceding manufacturing stages has been successfully performed and validated.

The manufacturing stages can each comprise a number of layers of the generative manufacturing process, i.e. the manufacturing process is paused for a validation following a specific number of printed layers in each case. For purposes of documentation and monitoring, the print job entity 11 can also add the manufacturing parameters transmitted in each case following the manufacturing stages, together with a cryptographically encoded checksum, to the print history log if the transmitted manufacturing parameters have been successfully matched to the printing specification data stored in the print history log.

If all of the manufacturing stages of the generative manufacturing process have been released by the distributed validation network 13, i.e. if the finished component has been validated in its entirety, a certificate, regarding successful validation of the generative manufacturing process, can be created for the additively manufactured component B in a step M7 by a certification point 12. Then, in a step M8, this certificate can be added, together with a cryptographically encoded checksum such as a hash, to the print history log. Moreover, it is optionally possible for the 3D printing device 10 to apply a check code, corresponding to the certificate, to the additively manufactured component using a generative manufacturing method. The check code can, for example, be an alphanumeric string that corresponds to the last valid hash value of the certificate.

Figure 4:
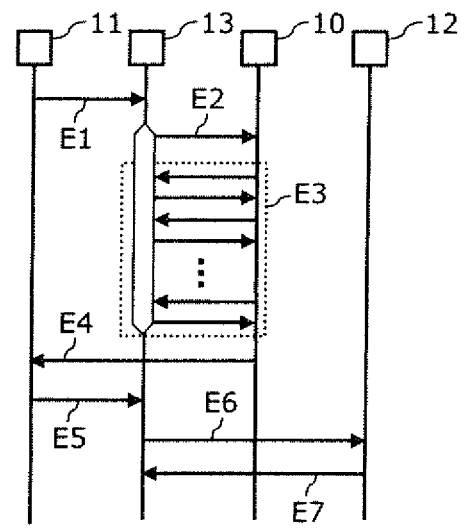
FIG. 4 is a flow chart of a validation and/or certification process in the run-up to and during the manufacturing of a component that is to be additively manufactured, in accordance with a further embodiment of the invention.

FIG. 4 is a flow chart of a validation and/or certification process E in the run-up to and during the manufacturing of a component that is to be additively manufactured, in accordance with a further embodiment of the invention. The flow chart can be used for validating and certifying the generative manufacturing of components, for example components B of the type that can be produced in a 3D printing device such as the 3D printing device 10 shown in FIG. 1. Here, the validation and/or certification process E can use the components of the infrastructure of the system 100, as has been explained in connection with FIG. 2. Moreover, the validation and/or certification process E can be used to implement the validation method M, as has been explained in connection with FIG. 3.

For example, following a request by a client for a component, a rights holder of a component, as the print job entity 11, sends a file E1, containing printing specification data, to a distributed validation network 13 consisting of a plurality of participating nodes. In this case, the printing specification data may be the geometric model data of the component that is to be manufactured, and information relating to the desired properties of the component and the parameters to be used during manufacturing. After the printing specification data have been validated by the distributed validation network 13, said data are forwarded, in E2, to the 3D printing device 10 at a producer, i.e. the printing contractor.

The actual printing process E3 begins thereafter, during the course of which process the 3D printing device 10 periodically sends back information, regarding the printing parameters used in the previous stage in each case, to the distributed validation network 13 for revalidation, i.e. for matching to the printing specification data. In the process, the printing parameters that are sent are in each case matched, for conformity, to the original printing specification data. The distributed validation network 13 can create a print history log ("ledger") in which both the printing specification data and some or all of the printing parameters that are sent back in each case for the purpose of validation are stored in a concatenated manner in blocks. Cryptographic checksums can be used for this purpose, for example hash values that are formed in accordance with a hash function by a combination of data to be newly entered and the hash value of the preceding block as the hash argument.

Following the step-by-step validation of the printing process E3, a completion message E4 is sent to the print job entity 11 upon successful completion. Said entity can in turn verify the correctness of the printing process E3 in a step E5. Subsequently, in a certification process E6, a certificate can optionally be requested from a certification point 12, and this can be stored, in a documentation process E7, as a block in the print history log in a similar manner to the rest of the information. All the information entered in the print history log is sorted chronologically and archived by means of the cryptographic checksums so as to be almost unmanipulable. In addition, the distributed validation network 13 can allow all parties access for the purposes of trackability.

Figure 5:
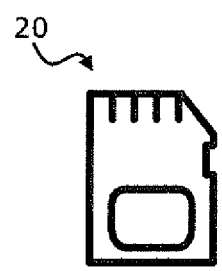
FIG. 5 is a schematic view of a computer-readable memory medium in accordance with a further embodiment of the invention.

FIG. 5 is a schematic view of a non-volatile computer-readable memory medium 20, on which computer-executable instructions are stored which, when executed on a data-processing system, prompt the data-processing system to carry out the steps of the validation method M explained in connection with FIG. 3. The memory medium 20 may for example comprise an SD card, a USB flash drive, a floppy disk, a CD, a DVD or a similar suitable medium. In the same way, the memory medium 20 can also comprise computer-executable instructions for a plurality of different data-processing devices of a distributed system, in which each of the plurality of data-processing devices can in each case execute part of the computer-executable instructions in order to thus implement the validation method M.

In the detailed description above, various features have been summarised in one or more examples so as to provide a more cogent representation. However, it should be clear here that the above description is of a purely illustrative, but in no way limiting nature. Said description serves to cover all alternatives, modifications and equivalents of the various features and embodiments. Many other examples will become immediately clear to a person skilled in the art owing to their expert knowledge in view of the above description.

The embodiments have been selected and described in order to be able to show, in the best possible way, the principles on which the invention is based and the possible applications thereof in practice. As a result, persons skilled in the art can optimally modify and use the invention and the various embodiments thereof with respect to the intended purpose thereof. In the claims and the description, the terms "containing" and "having" are used as neutral terms for the corresponding term "comprising". Furthermore, use of the terms "a", "an" and "one" is not in principle intended to exclude a plurality of such described features and components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for validating additively manufactured components, comprising:
    transmitting according to a block-chain protocol, to a distributed validation network by a print job entity, printing specification data for a component that is to be additively manufactured;
    validating the printing specification data by the distributed validation network, and adding the printing specification data, together with a cryptographically encoded checksum according to the block-chain protocol, to a print history log managed by the distributed validation network;
    transmitting the printing specification data by the print job entity to a 3D printing device; and
    implementing a generative manufacturing process for the component that is to be additively manufactured, by the 3D printing device and in accordance with the transmitted printing specification data,
    wherein, while the generative manufacturing process is being carried out, in each case following specified manufacturing stages, a plurality of manufacturing parameters prevailing in the preceding manufacturing stage are transmitted to the distributed validation network, and
    wherein subsequent manufacturing stages are released by the distributed validation network in order to be implemented in the 3D printing device only if the transmitted manufacturing parameters have been successfully matched to the printing specification data stored in the print history log.

2. The validation method of claim 1, wherein the cryptographically encoded checksum is formed by a hash function comprising the transmitted printing specification data and the cryptographically encoded checksum of the last log entry of the print history log as the function argument.

3. The validation method of claim 1, wherein, in addition to the geometrical information regarding the three-dimensional data model of the component that is to be additively manufactured, the printing specification data contain information regarding at least one of the printing material to be used, the temperature to be used during the additive manufacturing, the ambient pressure to be applied during the additive manufacturing, the quantity of printing material to be used and the type of generative manufacturing process to be implemented.

4. The validation method of claim 1, wherein the 3D printing device and the print job entity are spatially separated from one another.

5. The validation method of claim 1, further comprising:
    creating, by a certification point, a certificate, regarding successful validation of the generative manufacturing process, for the additively manufactured component if each of the manufacturing stages of the generative manufacturing process has been released by the distributed validation network.

6. The validation method of claim 5, further comprising adding the certificate, together with a cryptographically encoded checksum, to the print history log.

7. The validation method of claim 5, wherein the 3D printing device applies a check code, corresponding to the certificate, to the additively manufactured component using a generative manufacturing method.

8. The validation method of claim 1, wherein the manufacturing parameters transmitted following the manufacturing stages are added, together with a cryptographically encoded checksum, to the print history log if the transmitted manufacturing parameters have been successfully matched to the printing specification data stored in the print history log.

9. The validation method of claim 1, wherein the manufacturing stages each comprise a specified number of print layers of the generative manufacturing process.

10. The validation method of claim 1, wherein the generative manufacturing process is carried out using a metal material for manufacturing the component.

11. The validation method of claim 1, wherein the generative manufacturing process comprises stereolithography.

12. The validation method of claim 1, wherein the generative manufacturing process comprises selective laser sintering.

13. The validation method of claim 1, wherein the generative manufacturing process comprises selective laser melting.

14. A system for validating and certifying additively manufactured components, comprising:
    a print job entity configured to transmit according to a block-chain protocol, to a distributed validation network, printing specification data for a component that is to be additively manufactured, said network being configured to validate the printing specification data and to add said data, together with a cryptographically encoded checksum according to the block-chain protocol, to a print history log managed by the distributed validation network; and
    a 3D printing device configured to implement a generative manufacturing process for the component that is to be additively manufactured, in accordance with the printing specification data transmitted by the print job entity to the 3D printing device,
    wherein the 3D printing device is configured to transmit to the distributed validation network, while the generative manufacturing process is being carried out and in each case following specified manufacturing stages, a plurality of manufacturing parameters that are prevailing in the preceding manufacturing stage, and to implement subsequent manufacturing stages only if the distributed validation network has successfully matched the transmitted manufacturing parameters to the printing specification data stored in the print history log.

15. The system of claim 14, further comprising:
a certification point configured to create a certificate, relating to successful validation of the generative manufacturing process, for the additively manufactured component if each of the manufacturing stages of the generative manufacturing process has been released by the distributed validation network.

16. The system of claim 15, wherein the certificate is added, together with a cryptographically encoded checksum, to the print history log.

17. The system of claim 15, wherein the 3D printing device is further configured to apply a check code, corresponding to the certificate, to the additively manufactured component using a generative manufacturing method.

18. A non-transitory computer-readable memory medium, on which computer-executable instructions are stored which, when executed on a data-processing system, prompt the data-processing system to carry out the steps of a validation method, the validation method comprising:

transmitting according to a block-chain protocol, to a distributed validation network by a print job entity, printing specification data for a component that is to be additively manufactured;

validating the printing specification data by the distributed validation network, and adding the printing specification data, together with a cryptographically encoded checksum according to the block-chain protocol, to a print history log managed by the distributed validation network;

transmitting the printing specification data by means of the print job entity to a 3D printing device; and implementing a generative manufacturing process for the component that is to be additively manufactured, by means of the 3D printing device and in accordance with the transmitted printing specification data, wherein, while the generative manufacturing process is being carried out, in each case following specified manufacturing stages, a plurality of manufacturing parameters prevailing in the preceding manufacturing stage are transmitted to the distributed validation network, and wherein subsequent manufacturing stages are released by the distributed validation network in order to be implemented in the 3D printing device only if the transmitted manufacturing parameters have been successfully matched to the printing specification data stored in the print history log.

* * * * *